United States Patent [19]
Joos et al.

[11] Patent Number: 5,179,549
[45] Date of Patent: Jan. 12, 1993

[54] STATISTICAL MEASUREMENT EQUIPMENT AND TELECOMMUNICATION SYSTEM USING SAME

[75] Inventors: Peter F. A. Joos, Kontich; Willem J. A. Verbiest, Zwijndrecht, both of Belgium

[73] Assignee: Alcatel N.V., Amsterdam, Netherlands

[21] Appl. No.: 589,442

[22] Filed: Sep. 10, 1990

[63] Continuation of PCT/EP88/01037, Nov. 10, 1988, Published as WO90/05416.

[51] Int. Cl.$^5$ .............................. H04J 3/14; H04J 3/22
[52] U.S. Cl. ............................... 370/17; 370/84; 375/10
[58] Field of Search ............... 370/13, 17, 58.1, 60, 370/60.1, 61, 79, 84, 94.1; 375/10, 58; 371/5.5, 20.1, 5.1; 364/550, 554, 565, 569, 484; 324/78 R, 78 D

[56] References Cited

U.S. PATENT DOCUMENTS

| | | | |
|---|---|---|---|
| 4,395,762 | 7/1983 | Wondergem et al. | 364/554 |
| 4,484,326 | 11/1984 | Turner | 370/94.1 |
| 4,779,267 | 10/1988 | Limb | 370/94.1 |
| 4,802,189 | 1/1989 | Wedler | 370/84 |
| 4,896,316 | 1/1990 | Lespagnol et al. | 370/94.1 |
| 4,912,702 | 3/1990 | Verbiest | 370/84 |

FOREIGN PATENT DOCUMENTS

| | | |
|---|---|---|
| 8804869 | 6/1988 | PCT Int'l Appl. |
| 9000331 | 1/1990 | PCT Int'l Appl. |

OTHER PUBLICATIONS

P. Joos, et al., "A Stastical Bandwidth Allocation...", Alcatel Bell, ICC 1989, Boston, Jun. 11–14, 1989.
Computer Networks and ISDN Systems, vol. 10, No. 1, Aug. 1985, Elsevier Science Publishers B. V. (North-Holland), (Amsterdam, NL).
J. P. Fernow et al.: "Stability of adaptive congestion controls in packet networks", pp. 7–18, see p. 7, right-hand column, line 1-p. 11, end of page.
PTR-Philips Telecommuncations & Data Systems Review, vol. 46, No. 2, Jun. 1988 (Hilversum, NL).
F. C. Schoute: "Simple decision rules for acceptance of mixed traffic streams", pp. 35–48, see p. 39, lines 1–25; p. 41, line 15-p. 43, end of page; pp. 46–47, whole annex.

*Primary Examiner*—Benedict V. Safourek
*Assistant Examiner*—Alpus H. Hsu
*Attorney, Agent, or Firm*—Brunell & May; John M. May

[57] ABSTRACT

The measurement equipment (SMC) is used in a telecommunication switching system to check if the cell rate of each of a plurality of individual cell streams multiplexed in a same link remains within the limits on the basis of which its multiplexing was allowed. To this end the equipment checks at the end of each measurement interval (MTI) and for a plurality of cell rates [(M-S)/A, (M-S/2)/A, ...] if the expected probabilities to exceed these cell rates are exceeded or not. In the positive the cell rate is limited by dropping cells. Thus an expected complementary (with respect to 1) cumulative probability distribution function of the cell rate is approximated by a staircase-shaped function.

25 Claims, 6 Drawing Sheets

STATISTICAL MEASUREMENT EQUIPMENT AND TELECOMMUNICATION SYSTEM USING SAME

This is a application is a continuation of PCT/EP88/01037 filed Nov. 10, 1988 and published May 17, 1990 as WO90/05416.

TECHNICAL FIELD

The present invention relates to a statistical measurement equipment to determine the value of a statistical parameter of a variable.

BACKGROUND ART

Such a statistical measurement equipment is already known from the Belgian patent application No. 08701481 (W. VERBIEST 3) and the international patent application No. PCT/EP88/00594 (P. JOOS 1). It forms part of a telecommunication switching system operating according to the Asynchronous Transfer Mode (ATM), i.e. wherein data are transmitted under the form of cells or packets of bits and with a variable cell rate. An individual cell stream is allowed to be multiplexed on a same telecommunication link together with a plurality of other individual cell streams already multiplexed thereon, if an allocation formula is satisfied. This formula is based on the expected values of the mean and variance of the probability distribution function of the cell rate of the individual cell stream, on the expected values of the mean and variance of the probability distribution function of the cell rate of each of the above mentioned other individual cell streams already multiplexed on the link, as well as on the maximum allowable bandwidth on this link. This allocation formula is based on the assumption that a multiplex of a relatively high number of uncorrelated probability distribution functions leads to the normal probability distribution function, as follows from the Central Limit Theorem. However, because the mean and variance do not sufficiently define an arbitrary probability distribution function of the cell rate of a cell stream and if the number of cell streams of a multiplex is relatively low, e.g. 10, the resultant probability distribution function may be far from a normal one. As a consequence the use of the above allocation formula may give rise to an overload of the communication link.

As also described in the above literature the known statistical measurement equipment is able to measure the values of the mean and variance of the cell rate of each individual cell stream of a multiplex. The purpose of this measurement is to check if the source of this individual cell stream operates within the limits on the basis of which its multiplexing on the link was allowed. To this end the measurement equipment more particularly determines the value of the mean and variance of the cell rate of each individual cell stream at the receipt of each cell of this individual cell stream and compares the thus measured values with the above mentioned respective expected values thereof. Depending on the result of this comparison the received cell is then either allowed for further processing or discarded. But because the probability distribution function of the cell rate of the multiplex is not a normal one it may happen that the equipment erroneously allows a cell to be processed further.

From the above it follows that errors may occur because the probability distribution function of the cell rate of each cell stream is not always sufficiently defined by its mean and variance. More particularly, it has been found that errors are especially due to the fact that the tail of the probability distribution function of the cell rate is not sufficiently defined by these two parameters.

DISCLOSURE OF INVENTION

An object of the present invention is to provide a statistical measurement equipment of the above type, but which allows the probability distribution function of the variable to be defined in a more accurate way than by the above known mean and variance parameters.

According to the invention this object is achieved due to the fact that the present statistical measurement equipment includes means for measuring the value of said variable at least at the end of each measurement interval and means for then stepping at least one counter by a step which is a function of the value thus measured, the steps being so determined that after a plurality of time intervals said counter is in a position indicative of the deviation, from one or more expected values, of the probabilities to exceed corresponding predetermined values of said variable.

Another characteristic feature of the present statistical measurement equipment is that said predetermined values of said variable separate intervals to which distinct ones of said counter steps are assigned, that said measurement means measure said variable by determining the interval to which it belongs, and that said counter position is indicative of the deviation, from expected values, of the probabilities to exceed said predetermined values of said variable.

Still another characteristic feature of the present statistical measurement equipment is that said counter is stepped in the one or other direction depending on the measured value of said variable belonging to an interval at the one or other side of a selected one of said predetermined values, of said variable.

Yet another characteristic feature of the present statistical measurement equipment is that it further includes means associated to said counter and able to detect when said counter reaches a position indicative of a maximum allowable deviation and means coupled to said detecting means and able to reduce said deviation and therefore said probabilities by changing the value of said variable when said detecting means have detected said maximum allowable deviation.

In this way the equipment limits a number of probabilities to exceed a corresponding number of predetermined values of the variable and thus suitably monitors this variable.

Another characteristic feature of the present statistical measurement equipment is that it includes a plurality of said counters able to perform distinct sets of steps assigned to distinct sets of intervals, and that the intervals of all said sets are separated by successive predetermined values of said variable.

Yet another characteristic feature of the present equipment is that it includes a plurality of detecting means each associated to a respective one of said counters for detecting when this counter reaches a position indicative of a maximum allowable deviation and means coupled to said detecting means for reducing said deviation by changing said variable when at least one of said detecting means has detected a maximum allowable deviation and when the variable then has a value exceeding the selected predetermined value.

In this way the equipment limits the probabilities not to exceed predetermined values of the variable according to a staircase-shaped function and thus realises an approximation of an expected complementary (with respect to 1) cumulative probability distribution function of the variable.

The present invention also relates to a telecommunication switching system with a plurality of user stations coupled to a switching network through a statistical measurement equipment of the type described above, the variable being the cell rate of a cell stream generated by at least one of said user stations.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
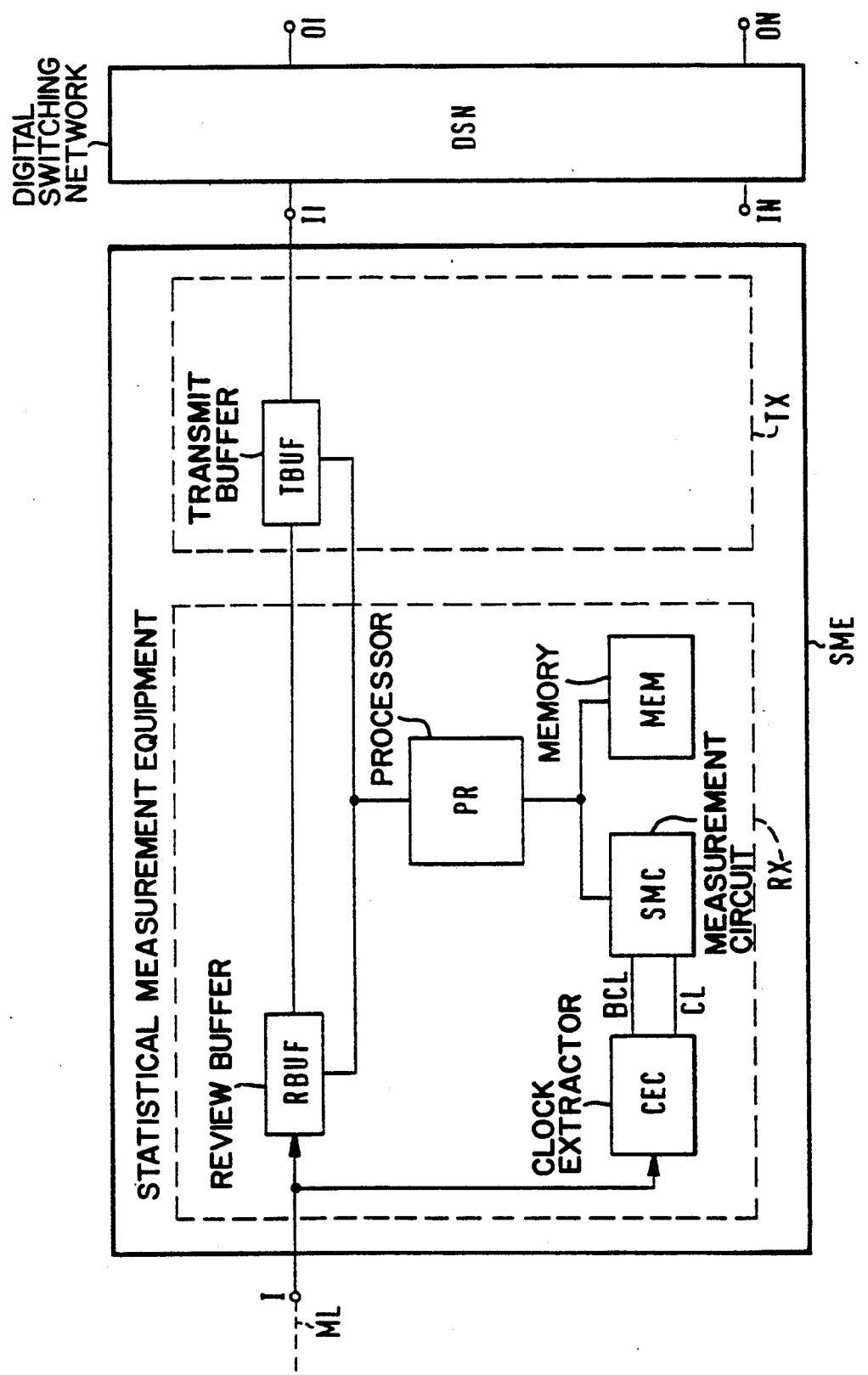
FIG. 1 is a schematic diagram of a statistical measurement equipment SME and of part of a telecommunication switching system in which it is included, both according to the invention.

Referring to FIG. 1 the ATM (Asynchronous Transfer Mode) data packet or data cell telecommunication system shown therein includes a digital switching network DSN which is for instance of the type disclosed in the Belgian patent No. 905 982 (De Prycker et al 2—2). This digital switching network DSN has a plurality of inputs I1 to IN and outputs O1 to ON which are coupled to user stations (not shown) via input and output multiplex links and statistical measurement equipments. For instance, a user station is connected to the input I1 of DSN via an input multiplex link ML and a statistical measurement equipment SME having an input I and an output I1.

The statistical measurement equipment SME comprises a receive port RX and a transmit port TX which are connected in cascade between the input I and the output I1. The receive port RX includes a receive buffer RBUF, a processor PR, a memory MEM, a statistical measurement circuit SMC and a clock extraction circuit CEC, whilst the transmit port TX includes a transmit buffer TBUF. The receive and transmit buffers RBUF and TBUF are connected in cascade between the input I and output I1. The processor PR has access to these buffers as well as to the statistical measurement circuit SMC and the memory MEM via connections which although represented by a single wire are in fact constituted by a plurality of these. The clock extraction circuit CEC is connected to the input I and has a bit clock output BCL and a cell clock output CL which are both connected to the measurement circuit SMC.

Figure 2:
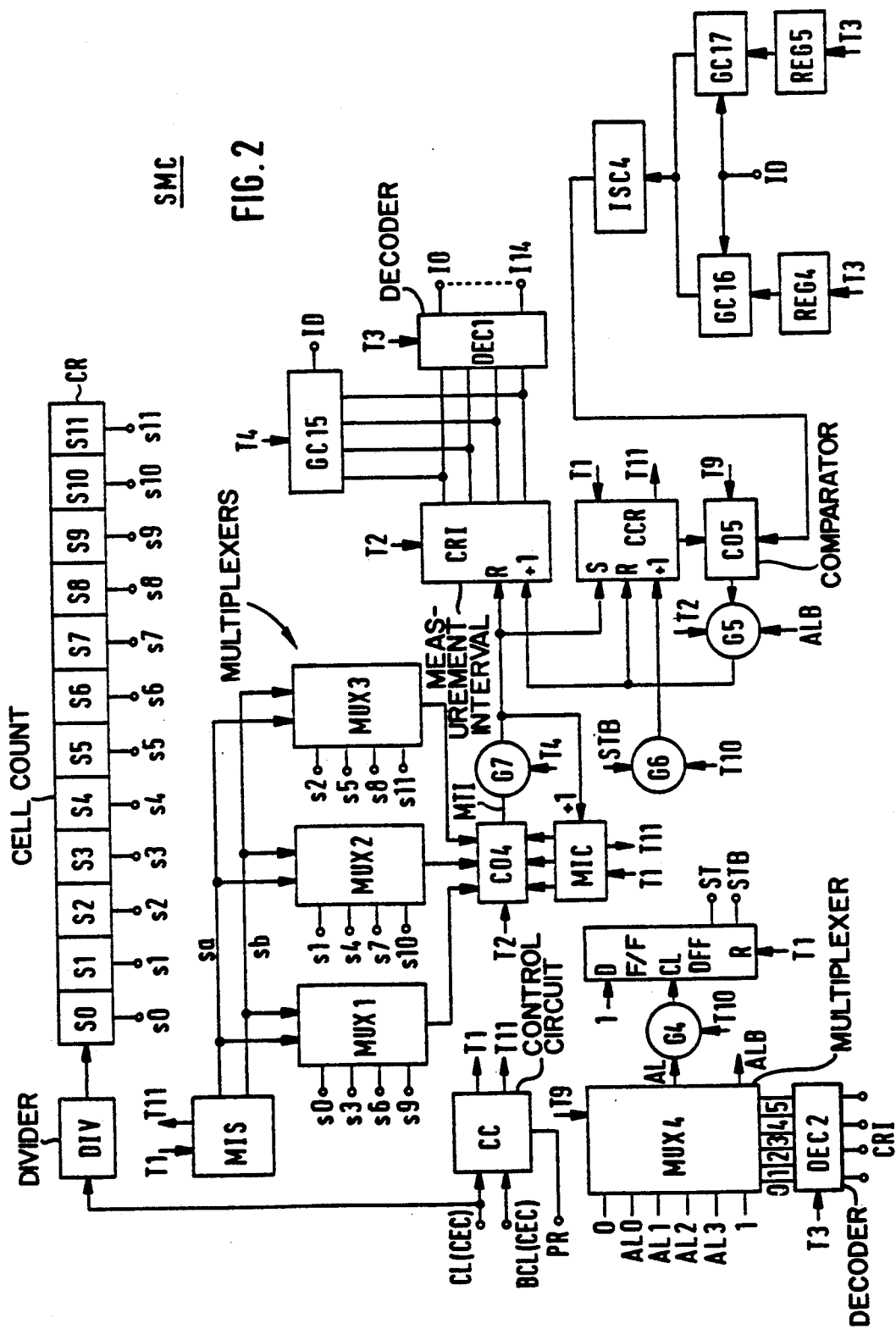
FIGS. 2 and 3 together represent in detail a statistical measurement circuit SMC forming part of the statistical measurement equipment SME of FIG. 1.
Figure 3:
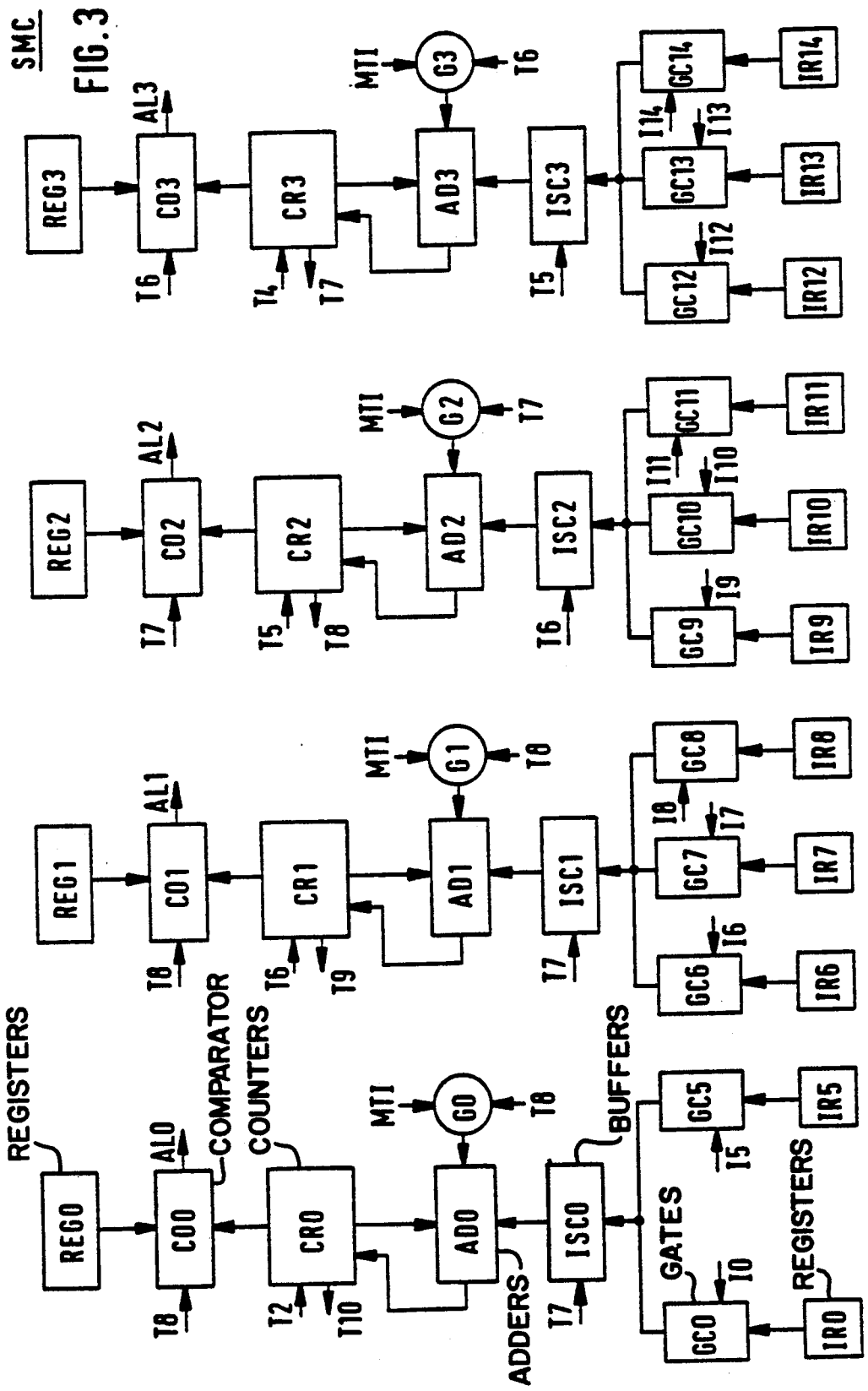

This circuit SMC which is shown in detail in FIGS. 2 and 3, includes a control circuit CC, a cell counter CR to count all the cells on the above link ML, a cell counter CCR to count the cells of each of the individual cell streams of the multiplex, a measurement interval counter MIC, a cell rate interval counter CRI, a measurement interval selection register MIS, decoder circuits DEC1 and DEC2, registers REG0/5, credit counters CR0/3, increment registers IR0/14, intermediate storage circuits IS0/4, adder circuits AD0/3, comparator circuits C00/5, a D-flipflop DFF, a divider circuit DIV, gating circuits GC0/17, AND-gates G0/7.

The cell clock output CL and the bit clock output BCL of the clock extraction circuit CEC are connected to the control circuit CC having outputs T1 to T11 which control various circuits of the equipment, as indicated in a schematic way. This control will become clear from the operation of the equipment. The cell clock output CL is also connected to the input of the cell counter CR through the divider circuit DIV which is able to divide by 1024. The cell counter CR comprises 12 stages S0/11 whose outputs s0/11 are subdivided in four groups s0/2, s3/5, s6/8 and s9/11, the three outputs of each group being connected to respective data inputs of the multiplexers MUX1/3. Each of these multiplexers MUX1/3 has two selection inputs sa and sb provided by the measurement interval selection register MIS. The outputs of the multiplexers MUX1/3 are connected to first inputs of the comparator C04 whose second inputs are connected to the output of the measurement interval counter MIC. The output MTI of this comparator C04 is connected via the gate G7 to the increment input of the counter MIC, to the reset input R of the cell rate interval counter CRI, to the set inputs of the cell counter CCR, and to inputs of the gates G0 to G3. The outputs of the cell rate interval counter CRI are connected to the decoder circuits DEC1 and DEC2 as well as to the gating circuit GC15.

The decoder circuit DEC1 is able to translate the 4-bit cell rate interval code CRI provided at the output of CRI into a 4-out-of-15 increment code I0/14 according to the following table wherein CRI is represented in decimal form.

TABLE 1

| I/CRI | 0 | 1 | 2 | 3 | 4 | 5 | 6 | 7 | 8 | 9 | 10 | 11 |
|---|---|---|---|---|---|---|---|---|---|---|---|---|
| 0  | 1 | 0 | 0 | 0 | 0 | 0 | 0 | 0 | 0 | 0 | 0 | 0 |
| 1  | 0 | 1 | 0 | 0 | 0 | 0 | 0 | 0 | 0 | 0 | 0 | 0 |
| 2  | 0 | 0 | 1 | 0 | 0 | 0 | 0 | 0 | 0 | 0 | 0 | 0 |
| 3  | 0 | 0 | 0 | 1 | 0 | 0 | 0 | 0 | 0 | 0 | 0 | 0 |
| 4  | 0 | 0 | 0 | 0 | 1 | 0 | 0 | 0 | 0 | 0 | 0 | 0 |
| 5  | 0 | 0 | 0 | 0 | 0 | 1 | 1 | 1 | 1 | 1 | 1 | 1 |
| 6  | 1 | 1 | 1 | 1 | 1 | 0 | 0 | 0 | 0 | 0 | 0 | 0 |
| 7  | 0 | 0 | 0 | 0 | 0 | 1 | 0 | 0 | 0 | 0 | 0 | 0 |
| 8  | 0 | 0 | 0 | 0 | 0 | 0 | 1 | 1 | 1 | 1 | 1 | 1 |
| 9  | 1 | 1 | 1 | 1 | 1 | 1 | 1 | 0 | 0 | 0 | 0 | 0 |
| 10 | 0 | 0 | 0 | 0 | 0 | 0 | 0 | 1 | 0 | 0 | 0 | 0 |
| 11 | 0 | 0 | 0 | 0 | 0 | 0 | 0 | 0 | 1 | 1 | 1 | 1 |
| 12 | 1 | 1 | 1 | 1 | 1 | 1 | 1 | 1 | 1 | 0 | 0 | 0 |
| 13 | 0 | 0 | 0 | 0 | 0 | 0 | 0 | 0 | 0 | 1 | 0 | 0 |
| 14 | 0 | 0 | 0 | 0 | 0 | 0 | 0 | 0 | 0 | 0 | 1 | 1 |

The bits I0/14 of the increment code thus provided by the decoder DEC1 control the respective gating circuits GC0/14 (FIG. 3) interconnecting the increment registers IR0/14, storing the respective increment values IN0/14, to a first input of the adder circuits AD0/3.

More particularly IR0/5, IR6/8, IR9/11 and IR12/14 are connected to the first inputs of the adder circuits AD0, AD1, AD2 and AD3 via the gating circuits GC0/5, GC6/8, GC9/11 and GC12/14 and the intermediate storage circuits ISC0/3 respectively. These adder circuits AD0/3 further have an enable input controlled by the outputs of the gates G0/3 respectively. The second inputs of these adder circuits AD0/3 are connected to the outputs of respective credit counters CR0/3 having an input connected to an output of the associated adder circuit AD0/3. Each of the credit counters CR0/3 has a further output which is connected to the first input of a respective one of the comparators CO0/3 whose second inputs are connected to the outputs of the registers REG0/3 respectively. Each of these registers stores all 1's.

The comparators C00/3 have outputs AL0/3 which are connected, together with other input signals which are continuously on 0 and 1 respectively, to the data inputs of the multiplexer MUX4 whose selection inputs are connected to the outputs of the decoder circuit DEC2. The latter is able to translate the 4-bit cell rate interval code CRI provided at the output of CRI into a 6-bit selection code which selects one of said inputs 0, AL0/3 and 1 according to the following table, wherein CRI is represented in decimal form:

TABLE 2

| SC/CRI | 0 | 1 | 2 | 3 | 4 | 5 | 6 | 7 | 8 | 9 | 10 | 11 |
|---|---|---|---|---|---|---|---|---|---|---|---|---|
| 0 | 1 | 1 | 1 | 0 | 0 | 0 | 0 | 0 | 0 | 0 | 0 | 0 |
| AL0 | 0 | 0 | 0 | 1 | 1 | 0 | 0 | 0 | 0 | 0 | 0 | 0 |
| AL1 | 0 | 0 | 0 | 0 | 0 | 1 | 1 | 0 | 0 | 0 | 0 | 0 |
| AL2 | 0 | 0 | 0 | 0 | 0 | 0 | 0 | 1 | 1 | 0 | 0 | 0 |
| AL3 | 0 | 0 | 0 | 0 | 0 | 0 | 0 | 0 | 0 | 1 | 1 | 0 |
| 1 | 0 | 0 | 0 | 0 | 0 | 0 | 0 | 0 | 0 | 0 | 0 | 1 |

The multiplexer MUX4 has an output AL which is connected through gate G4 to the clock input CL of the D-flipflop DFF whose data input D is continuously on 1 and whose reset input R is controlled by the timing pulse T1. The multiplexer MUX4 also has an output ALB providing an output signal which is the complement of that generated on AL and which controls the gate G5 connecting the output of the comparator C05 to the increment input of CRI as well as to the reset input of CCR. The flipflop DFF has a status output ST as well as a complementary status output STB which is connected to the increment input of the cell counter CCR through the gate G6.

The above mentioned gating circuit GC15 is able to detect the presence of the code 0000 at the output of CRI and has an output ID which controls both the gating circuits GC16 and GC17 interconnecting the respective registers REG4 and REG5 to a first input of the comparator C05 via the intermediate storage circuit ISC4. The second input of this comparator C05 is connected to the output of the cell counter CCR.

Because the above mentioned increment registers IR0/14 store the increment values IN0/14 it follows from FIG. 3 and from Table 1 that:

CR0 is able to be incremented by one of six increment-/decrement values IN0/5 under the control of I0/5. IN0, IN1, IN2, IN3, IN4 and IN5 are used for the cell rate intervals 0, 1, 2, 3, 4 and 5 to 11 respectively;

CR1 is able to be incremented by one of the increment values IN6/8 under the control of I6/8. IN6, IN7 and IN8 are used for the cell rate intervals 0/4, 5 and 6/11 respectively;

CR2 is able to be incremented by one of three increment value IN9/11 under the control of I9/11. IN9, IN10 and IN11 are used for the cell rate intervals 0/6, 7 and 8/11 respectively;

CR3 is able to be incremented by one of three increment values IN12/14 under the control of I12/14. IN12, IN13 and IN14 are used for the cell rate intervals 0/8, 9 and 10/11 respectively.

Before describing the operation of the equipment the choice of the counters CR0/3, the cell rate intervals CRI0/11 and the steps or increment values IN0/14 will be explained by making reference to FIG. 4.

This figure represents on the abscissa the cell rate CR and on the ordinate (on a logarithmic scale) the Gaussian probability to exceed this cell rate. This function is therefore called the complementary (with respect to 1) cumulative Gaussian probability distribution function of the cell rate. It is derived from a Gaussian probability distribution function with mean $m=M/A$ and standard destination $s=S/A$, wherein M, S and A are integer values obtained in a way which will be explained later.

Figure 4:
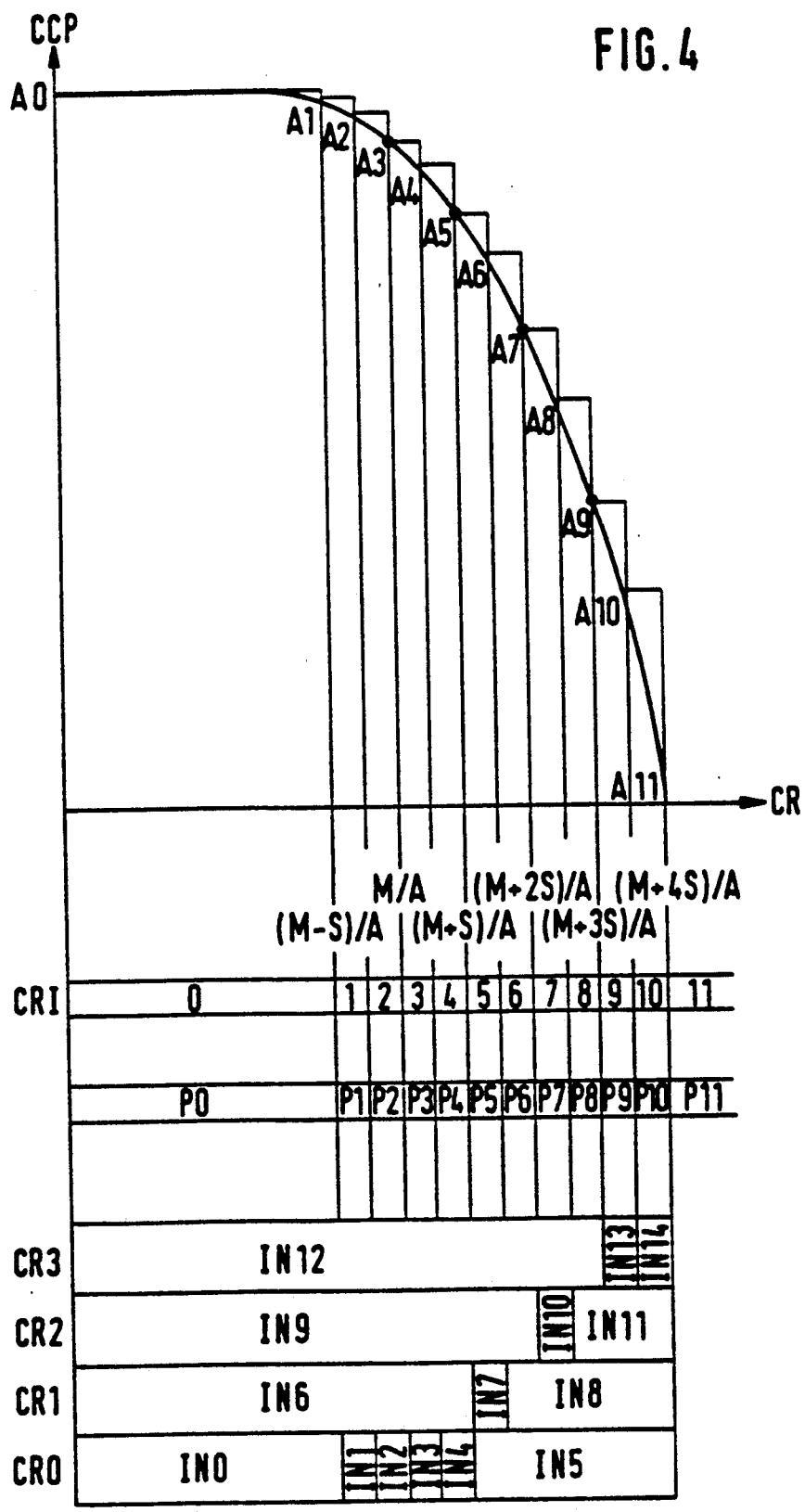
FIG. 4 represents a complementary cumulative Gaussian probability distribution function of the variable cell rate and other parameters used to illustrate the operation of the equipment of FIG. 1.

FIG. 4 also a represents a staircase function comprising the points A0 to A11 and approximating the curve CCP versus CR. For these points the cell rates are equal to 0, $(M-S)/A$, $(M-S/2)/A$, ..., $(M+4S)/A$ respectively, whilst the corresponding complementary cumulative probabilities are PA0=1, PA1, PA2, ..., PA10, PA11=0 respectively. Also shown in FIG. 4 are the cell rate intervals CRI0, CRI1, ..., CRI11 delimited by the last mentioned cell rates. The probabilities of the cell rates to be in these intervals CRI0 to CRI11 are P0 to P11, defined as follows:

$$P0 = P(0 = <CR = <(M - S)/A) \quad (1)$$
$$P1 = P[(M - S)/A < CR = <(M - S/2)/A] \quad (2)$$
.
.
.
$$P10 = P[(M + 7S/2)/A < CR = <(M + 4S)/A] \quad (3)$$
$$P11 = P[(CR > (M + 4S)/A] = 0 \quad (4)$$

The above complementary cumulative probability values PA0 to PA11 may therefore be written:

$$PA0 = 1 \quad (5)$$
$$PA1 = P1 + P2 + P3 + P4 + P5 + P6 + P7 + P8 + P9 + P10 \quad (6)$$
$$PA2 = \phantom{P1 +} P2 + P3 + P4 + P5 + P6 + P7 + P8 + P9 + P10 \quad (7)$$
$$PA3 = \phantom{P1 + P2 +} P3 + P4 + P5 + P6 + P7 + P8 + P9 + P10 \quad (8)$$
.
.
.
$$PA5 = \phantom{P1 + P2 + P3 + P4 +} P5 + P6 + P7 + P8 + P9 + P10 \quad (9)$$
.
.
.
$$PA7 = \phantom{P1 + P2 + P3 + P4 + P5 + P6 +} P7 + P8 + P9 + P10 \quad (10)$$

$$PA9 = P9 + P10 \quad (11)$$
$$PA10 = P10 \quad (12)$$
$$PA11 = 0 \quad (13)$$

The above described equipment is able to monitor the above staircase approximation A0 to A11 of the complementary cumulative probability distribution curve CCP versus CR, shown in FIG. 4, by using the four counters CR0/3. These counters are more particularly used to monitor the probabilities in the points A1, A2, A3, A4; A5, A6; A7, A8; and A9, A10 respectively and this is possible due to a suitable choice of the corresponding increment values IN0/5, IN6/8, IN9/11 and IN12/14 respectively, as explained hereafter.

The three increment values IN6/8, IN9/11 and IN12/14 for the counters CR1, CR2 and CR3 are determined in a like way and therefore only the choice of IN12/14 for CR3 is described in detail.

Upon the receipt of each cell of an individual cell stream the cell rate interval CRI0/11 to which it belongs is measured and for each cell received at the end of a measurement time interval the credit counter CR3 is decremented by IN12 when the measured cell rate then belongs to one of the intervals CRI0/8 and is incremented by IN13 or IN14 when the cell rate measured then belongs to the interval CRI9 or CRI10 respectively. It is clear that after a sufficiently large number of measurements the number of times the counter CR3 is incremented or decremented by IN12, IN13 and IN14 is proportional to the probability P0+P1+ . . . +P8 that the cell rate is smaller than (M+3S)/A, to the probability P9 that this cell rate is comprised between (M+3S)/A and (M+7S/2)/A, and to the probability P10 that the cell rate is comprised between (M+7S/2)/A and (M+4S)/A respectively.

The increment/decrement values IN12/14 are now so chosen that after such a large number of measurements, and supposing that the counter CR3 was started from its zero position, it is then again in this zero position. This happens when:

$$(P0+P1+ \ldots +P8).(-IN12)+P9.IN13+P10.IN14=0 \quad (14)$$

or because $$P0+P1+ \ldots P10 = 1 \quad (15)$$

when $$[1-(P9+P10)].(-IN12)+P9.IN13+P10.IN14=0 \quad (16)$$

or when $$(1-PA9).(-IN12)+P9.IN13+P10.IN14=0 \quad (17)$$

The increment values IN13 and IN14 are for instance so chosen that:

$$P9.IN13 = P10.IN14 \quad (18)$$

thus giving a greater weight to the interval CRI10.
The relation (17) may then be written:

$$-IN12+PA9.IN12+2P10.IN14=0 \quad (19)$$

and may be satisfied by a suitable choice of the ratio IN12/IN14.

From the relation (19) it follows that at the end of a measurement interval the contents of the counter CR3 are indicative of the deviation of the real probabilities in the points A9 and A10 from their expected values. More particularly, the counter is negative or zero when these expected probabilities are not exceeded whereas it becomes positive when at least one of these probabilities exceeds its expected value PA9 or PA10. For this reason the counter CR3 may be used to monitor the probabilities in the points A9 and A10.

As will be described later this is done by limiting the cell rate and therefore the probabilities to exceed the expected values when the counter CR3 contents exceed a predetermined credit value.

For the counter CR0 the increment/decrement values IN0/5 are determined in such a way that the following relation is satisfied:

$$P0.(-IN0)+P1.(-IN1)+P2.(-IN2)+P3.IN3+P4.IN4+(P5+P6+ \ldots +P10).IN5=0 \quad (20)$$

Because of the symmetry around the cell rate M/A of the Gaussian probability distribution function from which the function CCP/CR was derived one has:

$$P0 = P5+P6+ \ldots +P10 \quad (21)$$

$$P1 = P4 \quad (22)$$

$$P2 = P3 \quad (23)$$

so that the relation (20) is satisfied for $$IN0 = IN5 \quad (24)$$

$$IN1 = IN4 \quad (25)$$

$$IN2 = IN3 \quad (26)$$

The increment values IN0/2 are now for instance so chosen that:

$$P0.IN0 = P1.IN1 = P2.IN2 \quad (27)$$

and for these values and those of (25) and (26) the relation (20) may be written:

$$-P0.IN0+P3.IN2+P4.IN1+(P5+P6+ \ldots +P10).IN0=0 \quad (28)$$

Because $$P2 > P1 > P0 \quad (29)$$

one has $$IN0 > IN1 > IN2 \quad (30)$$

so that one may write $$IN0 = IN2 + IN'0 \quad (31)$$

$$IN1 = IN2 + IN'1 \quad (32)$$

wherein IN'0 and IN'1 are positive values.

By taking the relations (31) and (32) into account the relation (28) becomes:

$$-3P0.IN0 + PA3.IN2 + P4.IN'1 + (P5 + \ldots + P10).IN'0 = 0 \quad (33)$$

From the relation (33) it again follows that the counter CR0 may be used to monitor the probabilities in the points A3 and A4 of the staircase A0/11 and because $PA3 = 1 - P0 - P1 - P2$, also in the points A1, A2 and A3 thereof.

Figure 5:
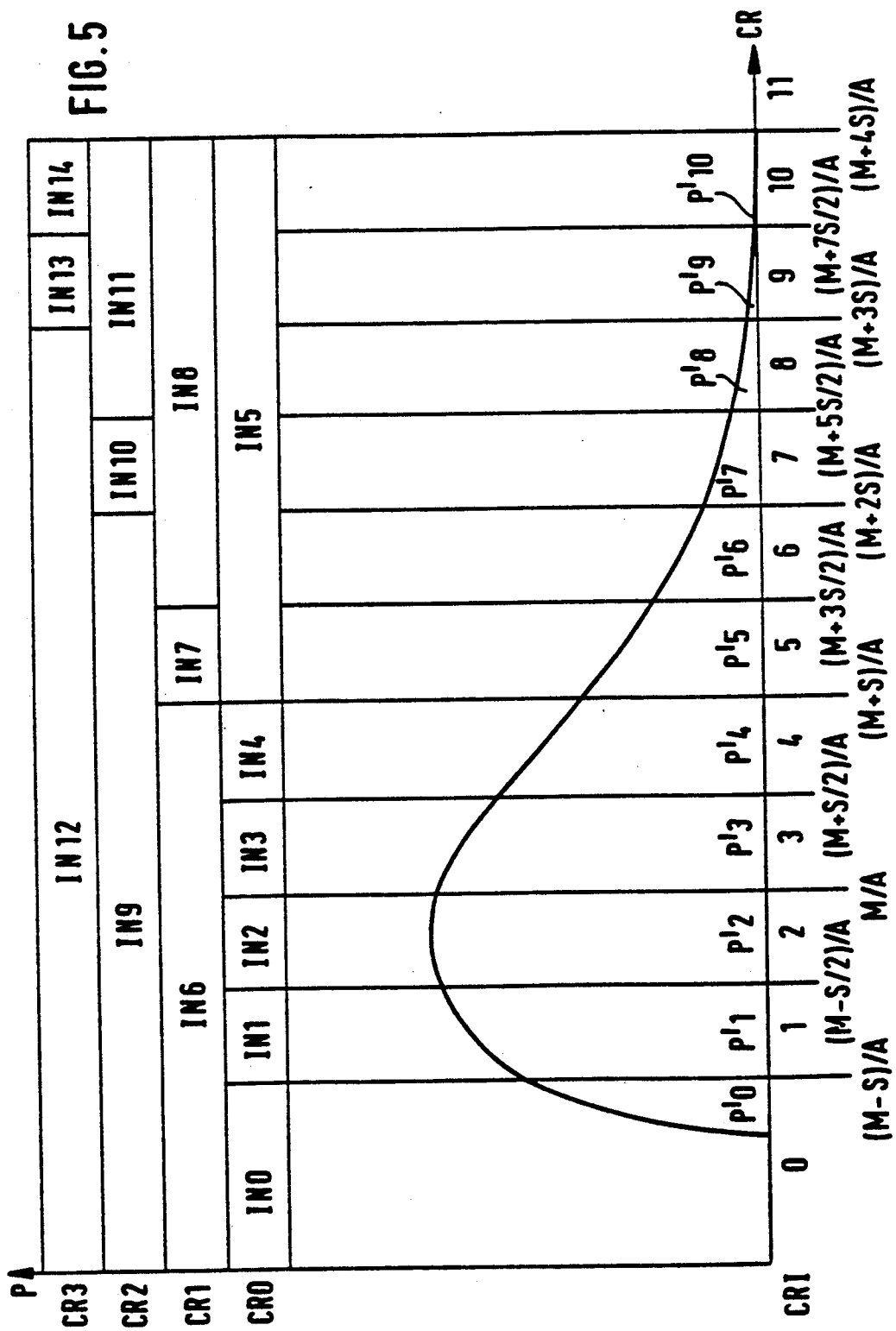
FIGS. 5 shows a probability distribution function of the variable cell rate also used to illustrate this operation.

In connection with the staircase of FIG. 5 it should further be noted that it has a mean m' and a standard deviation s' which are different from the mean $m = M/A$ and the standard deviation $s = S/A$ of the Gaussian probability distribution function which it envelopes. Indeed, the value m' is given by the relation:

$$m' = 1/A[(M-S).P0 + (M-S/2).P1 + \ldots + (M+4S).P10] \quad (34)$$

or $$m' = 1/A[M + 0.3S] = M'/A \quad (35)$$

In a similar way one may calculate that $$s' = s - 0.1S/A = S'/A \quad (36)$$

Reference is now made to FIGS. 1, 2, 3, 5 and 6 for the description of the operation of the equipment.

The user station (not shown) connected to the input multiplexer link ML is able to multiplex thereon a plurality of streams of data cells or packets of bits. The cells of a same data stream belong to a same communication and are identified by a same label. Each time this user station wants to transmit such a data stream towards a destination user station via the input link ML, the statistical measurement equipment SME and the digital switching network DSN in cascade, it starts a virtual path setup operation by transmitting towards the DSN a path setup control cell containing a distinct label, e.g. L1, and the values of various other parameters defining the data cell stream to be subsequently transmitted on the path to be established and if the path setup operation is successful.

For instance, when the user station wants to transmit a cell stream having the arbitrary probability distribution function shown in FIG. 5, first the corresponding complementary cumulative probability distribution function of the cell rate is determined and afterwards a complementary cumulative Gaussian probability distribution function enveloping this corresponding function is determined. The mean and standard deviation of this Gaussian curve are transmitted with the path setup cell.

To approximate this complementary cumulative Gaussian probability distribution function by a staircase, in the same way as described above with respect to FIG. 4, use is made of the counters CR0/3 with the same increments. However these counters are not able to count negatively. These are shown in FIG. 5 together with the cell rate intervals determined by the mean and the standard deviation.

Because the probability values P'0, P'1, ... shown in FIG. 5 are all not larger than the corresponding probability values P0, P1, ... of FIG. 4 it is clear that after a measurement interval each of the counters CR0/3 will normally be in a negative position, but will reach a positive position when at least one of the monitored probabilities is exceeded, as described above.

Figure 6:
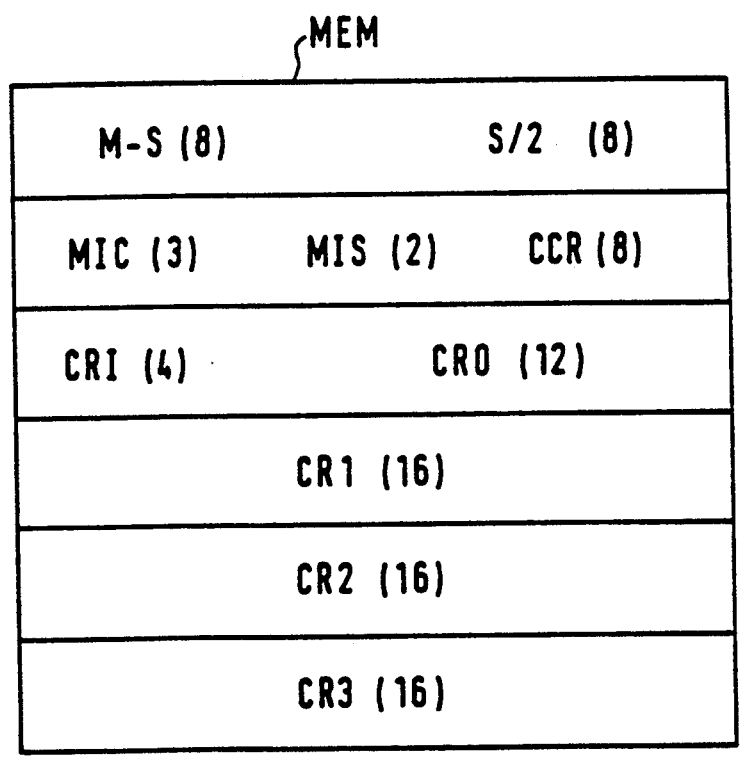
FIG. 6 shows part of the memory MEM of FIG. 1 in more detail.

When the above mentioned such a path setup control cell is received in the measurement equipment SME it is stored in the receive buffer RBUF thereof and processed by the processor PR. When the latter finds out that a path setup control cell is concerned it allocates a portion of the memory MEM shown in FIG. 6 to the communication with label L1 and determines from the expected values of the traffic parameters m and s the following other parameters:

MIS (measurement interval select): a 2-bit interval selection parameter to select one of 4 measurement time intervals having a duration of $A = 1024 \times 2 \exp 3a$ cells with $a = 0, 1, 2, 3$;

M: an 8-bit number of cells with label L1 such that the expected value of the mean m is equal to M/A;

S: an 8-bit number of cells with label L1 such that the expected value of the standard deviation s is equal to M/A;

The processor PR stores the values M-S and S/2 in the above mentioned portion of the memory MEM shown in FIG. 6 and subsequent to this storage operation it controls the transmission of the path setup control cell to the transmit buffer TBUF of the transmit port TX which afterwards transfers the control cell to the digital switching network DSN. In a manner similar to the one described in the Belgian patent No 08701481 (W. Verbiest 3) in each stage of this network an output link is selected and an allocation formula is calculated to check if the control cell—and the data cells of the same communication following it—may be multiplexed on this output link. However, because the user station wants the curve of FIG. 4 to be approximated by the staircase shown therein in the allocation formula, use is made of the above given values m' and s' instead of m and s. Assuming that following the calculation a virtual path may thus be set up to the destination user station, the latter transmits a confirmation cell to the originating user station which may then start the transmission of the corresponding individual data cell stream with label L1 on the multiplex link ML on which other individual data cell streams are possibly already multiplexed. For this data stream the statistical measurement equipment SME checks if it operates within the traffic limits defined by the parameters which were stored in the memory MEM in the way described above.

When following the receipt of a data cell with label L1 in the buffer circuit RBUF of the receive port RX, the processor PR detects the presence of this data cell it transmits to the memory MEM a partial memory address PA which is function of the label L1 contained in the data cell. It also stores the following parameters which are updated upon the receipt of the data cells, as will become clear later:

MIC: a 3-bit counter value indicating the measurement interval during which the last data cell having label L1 was received;

CCR: the contents of the cell counter CCR;

CR0/3: the contents of the credit counters CR0/3;

CRI: a 4-bit cell rate interval indicating one of 12 cell rate intervals CRI0 to CRI11 (FIGS. 5, 6).

The clock extraction circuit CEC extracts a bit clock BCL and a cell clock CL from the incoming data cell stream and applies both BCL and CL to the control circuit CC which in response thereat provides at its outputs T1 to T11 a set of 11 successive non-overlapping timing pulses T1 to T11 (not shown) which cover a period equal to the duration of the received data cell and which are used to control various circuits of the SMC, as already mentioned.

Because the cell clock signal CL is also applied to the divider circuit DIV which realises a division by 1024 the resulting clock signal CL increments the cell counter CR by 1 each time 1024 cells have been counted.

With a bitrate of the incoming cell stream equal to 600 Megabits/sec and with cells having a length of 280 bits, BCL and CL are respectively equal to 600 Megabits/sec and 2.14 Megacells/sec. In this case each cell has a duration of 466.67 nanoseconds and T1 to T11 each have a duration of 1/11th of this value. The control of SMC by the timing pulses T1 to T11 is now considered:

Timing pulse T1

The processor PR loads the parameters MIC, MIS and CCR from the memory MEM into the like named circuits of SMC. Assuming that MIS is equal to 01 the selection outputs sa and sb of the measurement interval selection register MIS controlling the multiplexers MUX1/3 are on 0 and 1 respectively, so that only the outputs s3, s4 and s5 of the stages S3, S4 and S5 of the counter CR are connected to the associated comparator C04. This means that the cell counter CR and the multiplexers MUX1/3 are used to provide the successive identities of measurement intervals having each a duration of 1024×8 data cells. The 3-bit value MIC identifying the last measurement time interval during which a data cell with label L1 was received is applied to the comparator C04. Finally, the cell counter value CCR is applied to the comparator C05.

By the timing pulse T1 also the D-flipflop DFF is reset. Thus the status output signal ST of this flipflop is brought in the condition 0 indicating that the cell with label L1 is in principle allowed to be transmitted further.

Timing pulse T2

The processor PR loads the cell rate interval value CRI and the credit value CR0 from the memory MEM into the like named circuits CRI and CR0 of SMC. Also the comparator C04 is enabled so that the 3-bit value MIC identifying the last measurement interval during which a data cell with label L1 was received is compared with the value stored in the stages S3, S4 and S5 of the counter CR and constituting the identity of the measurement time interval during which the data cell which is being processed is received. If both the compared identities are equal the output signal MTI of C04 is on 0 and in this case MIC is the identity of the present measurement interval. On the contrary, when both the compared identities are different the output MTI is on 1 indicating that the measurement interval has elapsed and that the value MIC has to be updated.

Timing pulse T3

The processor PR loads the values M−S and S/2 from the memory MEM into the respective registers REG4 and REG5 and enables the operation of the decoder circuits DEC1 and DEC2. As a consequence the latter decodes the cell rate interval CRI into the 15-bit increment code I0/14 according to the Table 1. Thus one gating circuit is enabled for operation in each of the groups GC0/5, GC6/8. GC9/11 and GC12/14 (FIG. 3).

Timing pulse T4

The processor PR enables the gating circuit GC15 so that it is checked if the cell rate interval CRI is 0 or not. In the former case the output ID of GC15 is on 0, whereas in the latter case it is on 1. As a result either the gating circuit GC16 or GC17 is enabled, so that either the value M−S or S/2 stored in REG4 or REG5 is stored in the intermediate storage circuit ISC4 associated to the comparator C05.

The processor PR also loads the credit value CR3 from the memory MEM into the like named credit counter CR3.

It moreover performs the following functions if the output MTI of the comparator C04 is on 1, indicating that the measurement time interval has elapsed:

via the gate G7 the identity of the measurement interval stored in the counter MIC is incremented by 1 so that this counter then stores the identity of the new interval;

via the same gate G7 the set input S of the cell counter CCR is activated so that it is brought in the position 1. Thus the receipt of the first cell during the new measurement interval is registered;

finally, via the same gate G7 also the cell rate interval counter CRI is reset due to its reset input R being activated. Thus the counter CRI indicates the identity 0000 of the first cell rate interval.

Timing pulse T5

The processor PR loads the credit value CR2 from the memory MEM into the like named credit counter CR2 and enables the intermediate storage circuit ISC3 associated to the adder circuit AD3. Thus one of the increment values IN12/14 stored in the increment registers IR12/14 is transferred via GC12/14 into this intermediate storage circuit ISC3.

Timing pulse T6

The processor PR loads the credit value CR1 from the memory MEM into the like named credit counter CR1 and enables the intermediate storage circuit ISC2 associated to the adder circuit AD2. Thus one of the increment values IN9/11 stored in the increment registers IR9/11 is transferred via GC9/11 into this intermediate storage circuit ISC2.

Also an input T6 of the gate G3 is activated so that if the measurement interval has elapsed, MTI being then on 1, the adder circuit AD3 is operated. As a consequence it adds the increment values stored in ISC3 to the credit value stored in ISC3, the result of this operation being stored in CR3. However, in case this adding operation exceeds a predetermined positive credit value, i.e. when AD3 overflows, it changes the contents of CR3 to all 1's.

Finally, during the time interval T6 the comparator C03 compares the contents of CR3 and REG3 which stores all 1's and produces an output signal AL3 which is on 1 when an equality is detected and on 0 in the other case. This means that AL3 is on 1 when the adder circuit AD3 has detected an overflow.

Timing pulse T7

The processor PR loads the credit value CR3 stored in CR3 back into the memory MEM. It further enables the intermediate storage circuits ISC1 and ISC0 associated to the adder circuits AD1 and AD0 respectively. Thus one of the increment values IN6/8 stored in the increment registers IR6/8 and one of the increment values IN0/5 stored in the increment registers IR0/5 are transferred via GC6/8 and GC0/5 into the intermediate storage circuits ISC1 and ISC0 respectively. Also the input T7 of the gate G2 is activated so that if the measurement interval has elapsed, the output MTI of C04 being then on 1, the adder circuit AD2 is operated. This operation as well as that of C02, REG2 is similar to that of AD3, C03, REG3 considered above. This means that the output AL2 is on 1 when AD2 has detected an overflow.

Timing pulse T8

The processor PR loads the credit value CR2 stored in CR2 back into the memory MEM. Because the inputs T8 of the gates G0 and G1 are activated and if the measurement interval has elapsed, the output MTI of C04 being then on 1, the adder circuits AD0 and AD1 are operated. This operation as well as that of C00, REG0 and C01, REG1 is similar to that of AD3, C03, REG3 considered above. Hence, the output AL2 or AL3 on 1 when AD0 or AD1 has detected an overflow respectively.

Timing pulse T9

The processor PR loads the credit value CR1 stored in CR1 back into the memory MEM and enables the operation of the multiplexer MUX4. As a consequence and as follows from the above Table 2.
input 0 of this multiplexer is connected to the output
AL if the cell rate interval CR1 is 0, 1 or 2;
AL0 is connected to AL if CRI is 3 or 4;
AL1 is connected to AL if CRI is 5 or 6;
AL2 is connected to AL if CRI is 7 or 8;
AL3 is connected to AL if CRI is 9 or 10;
1 is connected to AL if CRI is 11;
Also the comparator C05 is enabled so that it compares the cell counter value stored in CCR with either the value M−S or S/2 depending on the cell rate interval stored in CRI being the interval 0 or one of the intervals 1-10 respectively. If the values compared are equal this is indicative of the fact that the cell interval has elapsed. In this case and when the output AL is on 0, or ALB on 1, then the cell rate interval counter CRI is incremented by 1 via the gate G5. Also the cell counter CCR is reset via the same gate G5 in order that a new cell count should be started.

Timing pulse T10

The processor PR loads the credit value CR0 stored in CR0 back into the memory MEM. In a first portion of T10 and via the gate G4 it brings the D-flipflop in the 1-condition if the output AL is on 1. As a consequence the status output ST is then on 1 indicating to the processor PR that the cell received should be dropped. On the contrary, if the status output ST remains in the 0-condition, or STB in the 1-condition, then the processor PR during a second portion of T10 increments the cell counter CCR by 1 via the gate G6.

Timing pulse T11

The processor PR stores the values of the parameters MIC, MIS and CCR back into the memory MEM.

From the above it follows that after the receipt of each cell with label L1 the following operations are performed by the measurement circuit SMC:

by MUX1/3, C04, MIC it is checked if the present measurement interval provided by the cell counter CR is a new one or not. This is indicated by the latched output MTI of C04 being on 1 or 0 respectively;

by DEC1 the increment values I0/14 for the previous cell rate interval CRI stored in CRI are determined for each of the counters CR0/3 and by DEC2 one of the inputs 0, AL0/3, 1 of MUX4 is selected;

if the measurement interval is a new one it is counted by MIC, the cell rate interval CRI is made equal to 0 and the new cell is counted by CCR. On the contrary if the measurement interval is the same as the previous one MIC, CRI and CCR are not changed. Moreover, in both cases it is checked by GC15 if CRI is on 0 or not and accordingly M−S or S/2 is registered in ISC4;

in case the measurement interval is a new one the above mentioned increment values for the counters CR0/3 are added to the credit values already stored therein by the respective adders AD0/3. By the circuits C00/3, REG0/3 it is then checked if one or more of these counters reach a predetermined positive credit value in which case the corresponding output AL0/3 is activated;

depending on the cell rate interval CRI previously selected by DEC2 the multiplexer MUX4 connects one of the inputs 0, AL0/3 and 1 to its output AL. More particularly 0, AL0, AL1, AL2, AL3 and 1 are connected to AL if the cell rate interval is 0, 1 or 2; 3 or 4; 5 or 6; 7 or 8; 9 or 10, 11. In this way cells will only be dropped when CR0/3 overflows and the cell rate is higher than $M/A$, $(M+S)/A$, $(M+2S)/A$ and $(M+3S)/A$ respectively. If AL is activated the status bit ST is changed to 1 indicating that the received cell has to be dropped. On the contrary, when AL is deactivated (or ALB=1) and when a number of cells equal to M−S or S/2 has been counted indicating the end of the cell rate interval, the cell rate counter CRI is incremented by 1 so as to indicate a new cell rate interval and the cell counter CCR is reset so that a new count can start;

when the status bit ST is not activated (STB=1) indicating that no cells have to be dropped the counter CCR is incremented.

It is clear from the above that for each received cell of an individual cell stream the cell rate interval is determined and as a function of this measurement the credit counters CR0/3 are incremented or decremented at the end of each measuring interval. When such a counter exceeds a predetermined credit value and when simultaneously the cell rate is higher than a predetermined one the cell is dropped.

While the principles of the invention have been described above in connection with specific apparatus, it is to be clearly understood that this description is made only by way of example and not as a limitation on the scope of the invention.

We claim:

1. Statistical measurement equipment to determine whether a variable relating to a rate at which data are transmitted over a particular communication link is within a predetermined probability distribution function of expected values for said variable, said equipment comprising at least one counter,
measuring means for establishing a sequence of measurement cycles and for determining a measured value of said variable at least at the end of each of said measurement cycles, and stepping means responsive to the measured value determined by the measuring means for stepping each said counter by a respective step selected from at least two predetermined counter steps such that after a plurality of said cycles, said each counter indicates whether a respective predetermined expected value for said variable in the tail of said predetermined probability distribution function is exceeded with a respective actual frequency that is greater than a corresponding predicted frequency derived from said predetermined probability distribution function.

2. Statistical measurement equipment according to claim 1, wherein said predetermined expected values of said variable correspond to separate intervals to which distinct ones of said predetermined counter steps are assigned, said measuring means measures said variable by determining the interval to which it belongs, and said each counter indicates whether said respective actual frequency is greater than said corresponding predicted frequency.

3. Statistical measurement equipment according to claim 2, wherein said counter is stepped in the one or other direction depending on the measured value of said variable belonging to an interval at the one or other side of a selected one of said predetermined values of said variable.

4. Statistical measurement equipment according to claim 3, wherein said predetermined steps are positive for values of said variable larger than said selected value of said variable and increase with increasing values of said variable.

5. Statistical measurement equipment according to claim 2, wherein a plurality of said counters are provided for performing distinct sets of steps assigned to distinct sets of intervals, and the intervals are defined by successive predetermined values of said variable.

6. Statistical measurement equipment according to claim 3, wherein a plurality of said counters is provided for performing distinct sets of steps assigned to distinct sets of intervals, the intervals are defined by successive predetermined values of said variable, and said equipment further comprises a plurality of detecting means each associated with a respective one of said counters for detecting when its associated counter reaches a position indicative of a maximum allowable deviation and reducing means coupled to said detecting means for reducing said deviation by changing said variable when at least one of said detecting means has detected a maximum allowable deviation.

7. Statistical measurement equipment according to claim 2, wherein said predetermined probability function is a complementary cumulative Gaussian probability distribution function of said variable.

8. Statistical measurement equipment according to claim 1, further comprising detecting means associated with said counter for detecting when said counter reaches a position indicative of a maximum allowable deviation and reducing means coupled to said detecting means for reducing said deviation and said frequency by changing the value of said variable when said detecting means have detected said maximum allowable deviation.

9. Telecommunication switching system comprising a statistical measurement equipment according to claim 8, a switching network, and at least one user station coupled to the switching network via said statistical measurement equipment, wherein said cell rate is associated with a cell stream generated by said at least one user station and said statistical measurement equipment comprises means for adaptively controlling said cell rate so that it remains within said predetermined probability distribution function as it is output from said statistical measurement equipment.

10. Telecommunication switching system according to claim 9, wherein said cell rate has an arbitrary complementary probability distribution function and said user station comprises means for communicating to said switching network the mean and standard deviation values of a complementary cumulative Gaussian probability distribution function which envelopes said arbitrary complementary probability distribution function.

11. Telecommunication switching system according to claim 10, wherein said predetermined probability function is a staircase probability distribution function, and said switching system comprises means responsive to said mean and standard deviation values for calculating modified mean and standard deviation values associated with said staircase probability distribution function and means responsive to said modified values for determining in accordance with a predetermined link allocation formula whether said cell stream is allowed to be multiplexed by the switching network on a corresponding output link of said network.

12. Telecommunication switching system according to claim 9, wherein said statistical measurement equipment is used in multiplex for a plurality of cell streams from a plurality of said user stations and said equipment further comprises a memory to temporarily store respective measured, expected and counter values for each of said cell streams.

13. Statistical measurement equipment responsive to a rate at which data are transmitted over a particular communication link, said equipment comprising means for determining, for at least one predetermined value of said rate in the tail of an associated probability distribution function, a frequency with which said rate actually exceeds said predetermined value, and means for changing said rate to limit said frequency to an expected value thereof.

14. Telecommunication switching system comprising a statistical measurement equipment according to claim 9, a switching network, and at least one user station coupled to the switching network via said statistical measurement equipment, wherein said cell rate is associated with a cell stream generated by said at least one user station and said statistical measurement equipment comprises means for adaptively controlling said cell rate so that it remains within said predetermined probability distribution function as it is output from said statistical measurement equipment.

15. Telecommunication switching system according to claim 14, wherein said cell rate has an arbitrary complementary probability distribution function and said user station comprises means for communicating to said switching network the mean and standard deviation values of a complementary cumulative Gaussian probability distribution function which envelopes said arbitrary complementary probability distribution function.

16. Telecommunication switching system according to claim 15, wherein said predetermined probability function is a staircase probability distribution function, and said switching system comprises means responsive to said mean and standard deviation values for calculating modified mean and standard deviation values associated with said staircase probability distribution function and means responsive to said modified values for determining in accordance with a predetermined link allocation formula whether said cell stream is allowed to be multiplexed by the switching network on a corresponding output link of said network.

17. Telecommunication switching system according to claim 14, wherein said statistical measurement equipment is used in multiplex for a plurality of cell streams from a plurality of said user stations and said equipment further comprises a memory to temporarily store respective measured, expected and counter values for each of said cell streams.

18. Statistical measurement equipment to determine whether a variable relating to the rate at which data are transmitted over a particular communication link is within a predetermined probability distribution function of expected values for said variable, said equipment comprising at least one counter, measuring means for determining a measured value of said variable at least at the end of each measurement cycle, and stepping means responsive to the measured value determined by the measuring means for stepping at least one said counter by a respective step selected from at least three predetermined counter steps such that after a plurality of said cycles, said at least one counter indicates whether either of at least two predetermined expected values for said variable are exceeded with a respective actual frequency that is greater than a corresponding predicted frequency derived from said predetermined probability distribution function.

19. Statistical measurement equipment according to claim 18, wherein said predetermined expected values of said variable correspond to separate intervals to which distinct ones of said predetermined counter steps are assigned, said measuring means measures said variable by determining the interval to which it belongs, and said counter indicates whether either said actual frequency is greater than the respective said corresponding predicted frequency.

20. Statistical measurement equipment according to claim 19, wherein said counter is stepped by positive steps or by negative steps depending on the measured value of said variable belonging to an interval at the one or other side of a selected one of said predetermined values of said variable.

21. Statistical measurement equipment according to claim 20, wherein said steps are positive for values of said variable larger than said selected value of said variable and increase with increasing values of said variable.

22. Statistical measurement equipment according to claim 19, wherein a plurality of said counters are provided for performing distinct sets of steps assigned to distinct sets of intervals, and the intervals are defined by successive predetermined values of said variable.

23. Statistical measurement equipment according to claim 20, wherein a plurality of said counters is provided for performing distinct sets of steps assigned to distinct sets of intervals, the intervals are defined by successive predetermined values of said variable, and said equipment further comprises a plurality of detecting means each associated with a respective one of said counters for detecting when its associated counter reaches a position indicative of a maximum allowable deviation and means coupled to said detecting means for reducing said deviation by changing said variable when at least one of said detecting means has detected a maximum allowable deviation.

24. Statistical measurement equipment according to claim 18, further comprising means associated with said counter for detecting when said counter reaches a position indicative of a maximum allowable deviation and means coupled to said detecting means for reducing said deviation and therefore said actual frequency by changing the value of said variable when said detecting means has detected said maximum allowable deviation.

25. Statistical measurement equipment according to claim 18, wherein said predetermined probability function is a complementary cumulative Gaussian probability distribution function of said variable.

* * * * *